(12) United States Patent
Onoda et al.

(10) Patent No.: US 12,427,639 B2
(45) Date of Patent: Sep. 30, 2025

(54) POWER TOOL

(71) Applicant: MAKITA CORPORATION, Anjo (JP)

(72) Inventors: Shinji Onoda, Anjo (JP); Takahiro Nishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/667,051

(22) Filed: May 17, 2024

(65) Prior Publication Data

US 2025/0050488 A1    Feb. 13, 2025

(30) Foreign Application Priority Data

Aug. 8, 2023  (JP) .................................. 2023-129496

(51) Int. Cl.
| | | |
|---|---|---|
| B25D 17/20 | (2006.01) | |
| H02K 9/14 | (2006.01) | |
| H02K 13/10 | (2006.01) | |
| B25D 16/00 | (2006.01) | |

(52) U.S. Cl.
CPC .............. *B25D 17/20* (2013.01); *H02K 9/14* (2013.01); *H02K 13/10* (2013.01); *B25D 16/006* (2013.01); *B25D 2217/0061* (2013.01); *B25D 2250/095* (2013.01); *B25D 2250/265* (2013.01)

(58) Field of Classification Search
CPC ........... B25D 17/20; H02K 9/14; H02K 13/10
See application file for complete search history.

(56) References Cited

U.S. PATENT DOCUMENTS

| | | | | |
|---|---|---|---|---|
| 5,055,728 | A * | 10/1991 | Looper ................. | H01R 39/38 |
| | | | | 310/90 |
| 10,434,635 | B2 * | 10/2019 | Blum ...................... | B25F 5/008 |
| 10,518,400 | B2 * | 12/2019 | Furusawa ............ | B25D 11/125 |
| 2013/0048327 | A1 * | 2/2013 | Machida ................ | B25D 17/24 |
| | | | | 173/162.2 |
| 2013/0087355 | A1 * | 4/2013 | Oomori .................. | B25B 21/02 |
| | | | | 173/94 |
| 2018/0015602 | A1 * | 1/2018 | Machida ................ | F16D 13/24 |
| 2022/0258320 | A1 | 8/2022 | Machida et al. | |

FOREIGN PATENT DOCUMENTS

JP         2022-124291 A    8/2022

\* cited by examiner

*Primary Examiner* — Nathaniel C Chukwurah
(74) *Attorney, Agent, or Firm* — Oliff PLC

(57) ABSTRACT

A power tool efficiently cools a motor and a brush, with a distance for insulation left between an inlet and an urging member. A power tool includes a motor, an output unit, a fan, a housing accommodating the motor and the output unit, having an inlet to suck in air from outside in response to rotation of the fan and an outlet to discharge the air sucked in, and accommodating the motor along a flow of the air between the inlet and the outlet, a brush retainer downstream from the inlet and including a brush and a conductive urging member urging the brush against a commutator, and a nonconductive cover located between the urging member and the inlet and covering the urging member.

15 Claims, 10 Drawing Sheets

POWER TOOL

CROSS-REFERENCE TO RELATED APPLICATIONS

This application claims the benefit of priority to Japanese Patent Application No. 2023-129496, filed on Aug. 8, 2023, the entire contents of which are hereby incorporated by reference.

BACKGROUND

1. Technical Field

The disclosure relates to a power tool such as a hammer drill.

2. Description of the Background

A known alternating current device as a power tool, such as a hammer drill, includes a brushed motor. The brushes are held by a ring-shaped brush holder through which a rotor extends. The brushes are pressed against a commutator by metal urging members such as spiral springs.

A fan is located at the front of the rotor. As the fan rotates in response to rotation of the rotor, external air is sucked through inlets on a housing and is discharged through outlets located radially outward from the fan, thus generating an airflow. The airflow cools the motor and the brushes (refer to, for example, Japanese Unexamined Patent Application Publication No. 2022-124291).

BRIEF SUMMARY

To increase the efficiency of cooling the motor and the brushes, the inlets may be located near the brush holder. For conductive urging members for urging the brushes, however, the inlets are located apart from the brush holder to leave a distance for insulation between the inlets and the urging members. This may not allow efficient cooling.

One or more aspects of the disclosure are directed to a power tool that efficiently cools its motor and brush, with a distance for insulation left between the inlet and the urging member.

One aspect of the disclosure provides a power tool, including:
 a motor including
  a stator, and
  a rotor including a commutator and a rotational shaft;
 an output unit drivable by the motor;
 a fan located on the rotational shaft;
 a housing accommodating the motor and the output unit, the housing having an inlet to suck in air from outside in response to ration of the fan and an outlet to discharge the air sucked in, the housing accommodating the motor along a flow of the air between the inlet and the outlet;
 a brush retainer downstream from the inlet, the brush retainer including
  a brush in contact with the commutator, and
  an urging member being conductive and urging the brush against the commutator; and
 a cover being nonconductive and detachably attached to the housing, the cover being located between the urging member and the inlet and covering the urging member.

The power tool according to the above aspect of the disclosure efficiently cools the motor and the brush, with a distance for insulation left between the inlet and the urging member.

DETAILED DESCRIPTION

Embodiments of the disclosure will now be described with reference to the drawings.

Figure 1:
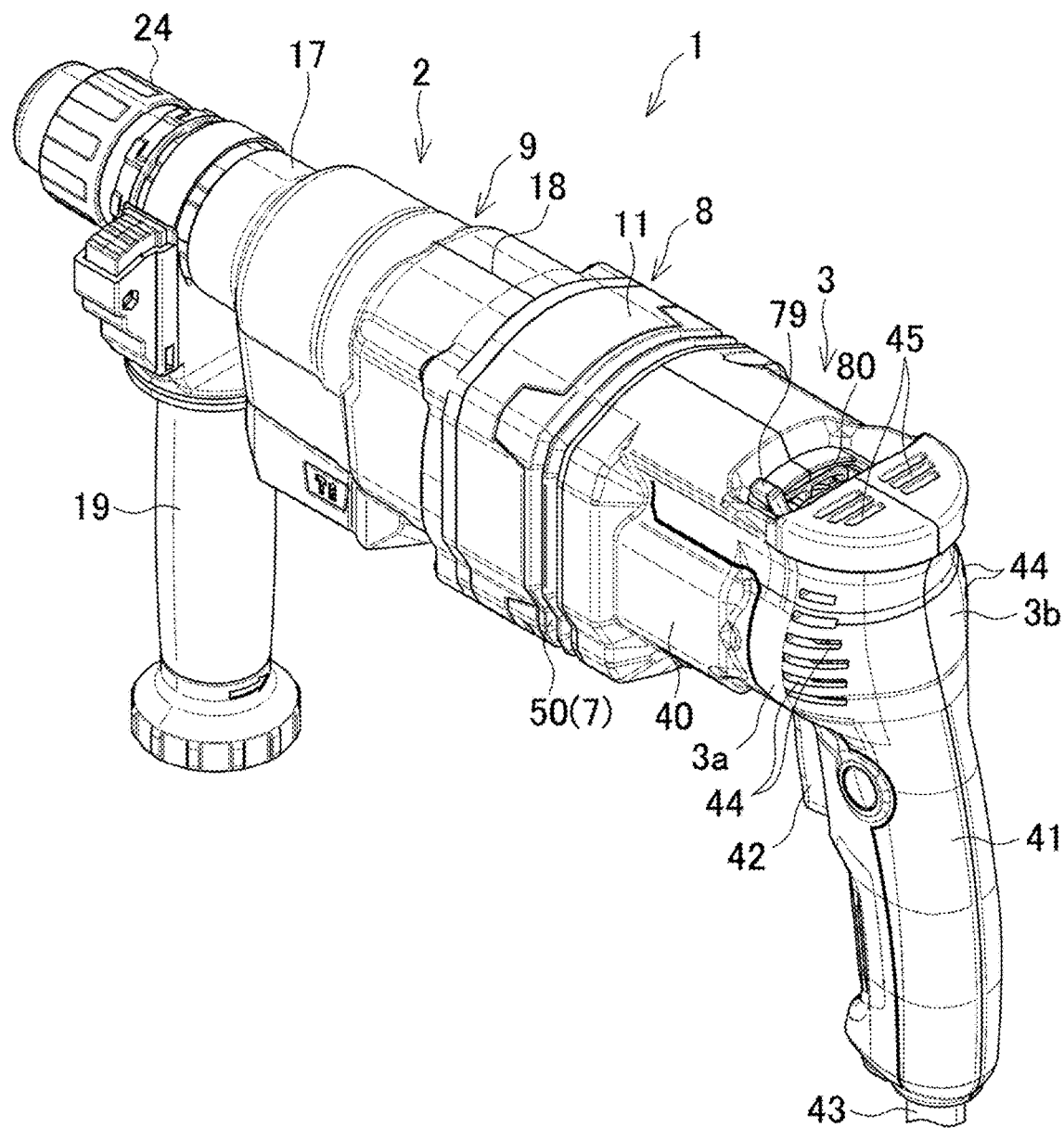
FIG. 1 is a rear perspective view of a hammer drill.
Figure 2:
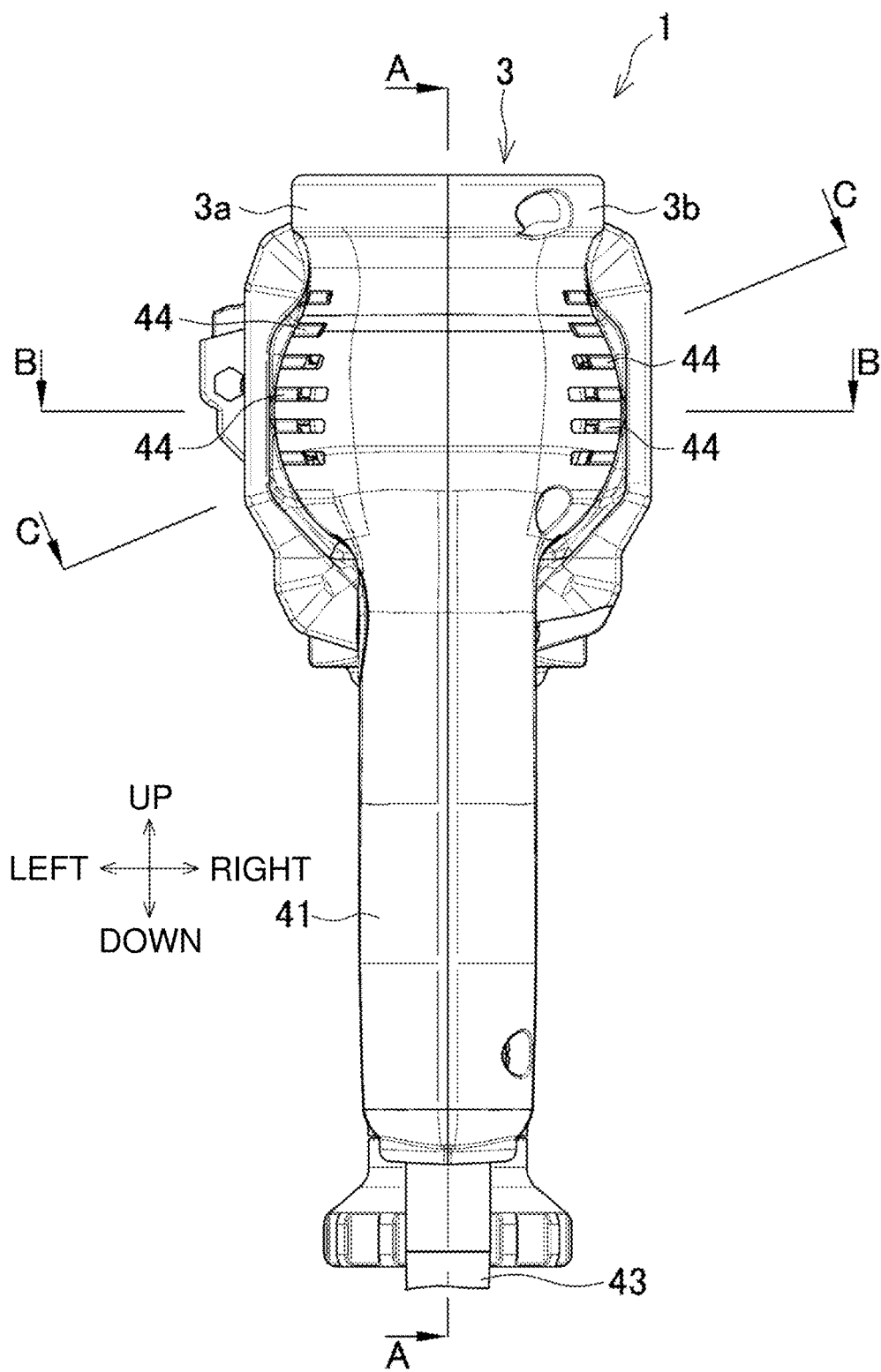
FIG. 2 is a rear view of the hammer drill.
Figure 3:
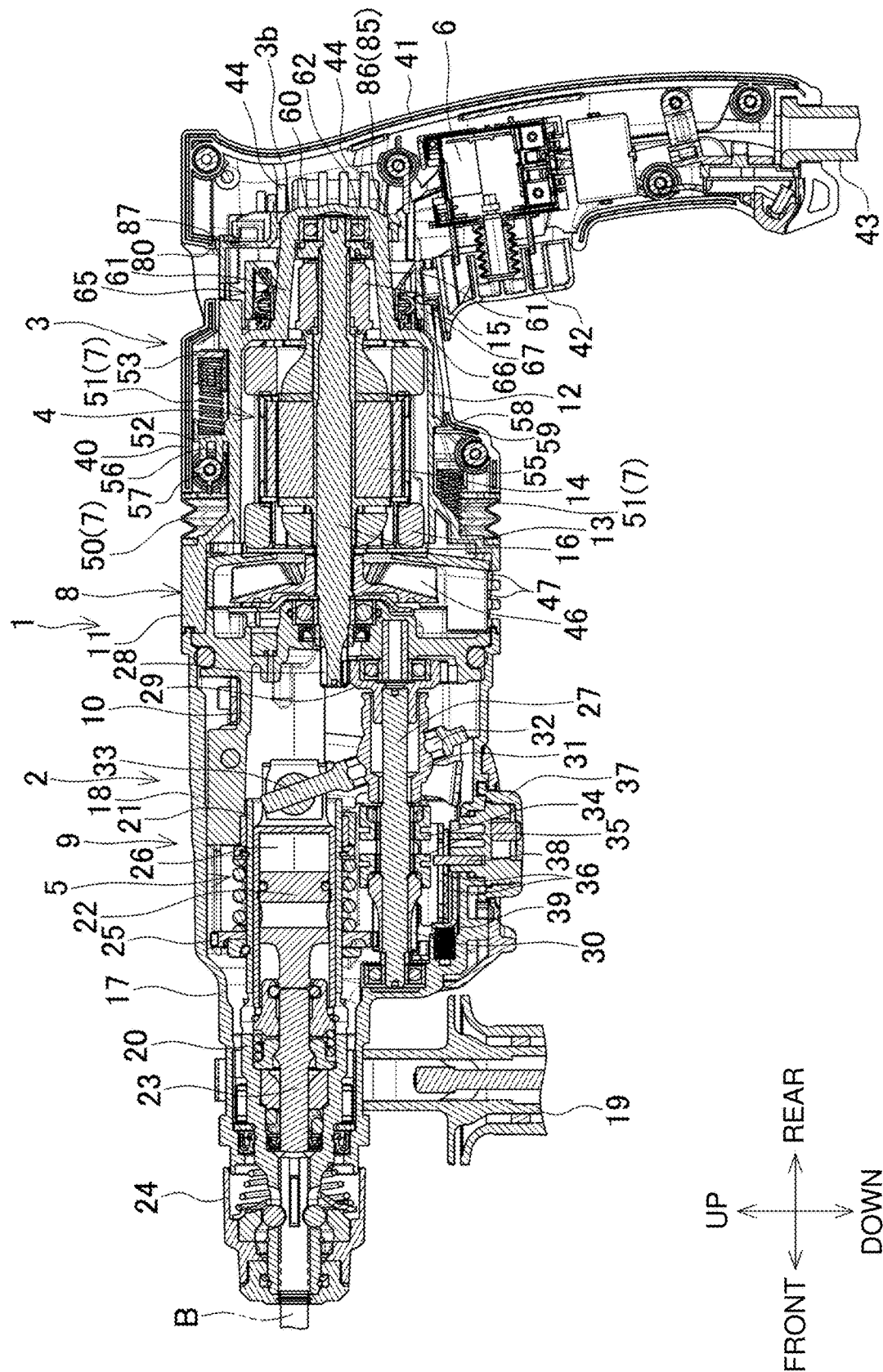
FIG. 3 is a sectional view taken along line A-A in FIG. 2.

FIG. 1 is a rear perspective view of a hammer drill as an example of a power tool. FIG. 2 is a rear view of the hammer drill. FIG. 3 is a sectional view taken along line A-A.

A hammer drill 1 includes housings as a front housing (first housing) 2 and a rear housing (second housing) 3. The front housing 2 accommodates a motor 4 and an output unit 5. The rear housing 3 accommodates a switch 6.

The front housing 2 and the rear housing 3 are movable relative to each other in the front-rear direction. A vibration isolator 7 (described later) is located between the front housing 2 and the rear housing 3.

The front housing 2 includes a motor housing 8, an outer housing 9, and an inner housing 10. The motor housing 8 is formed from resin. The motor housing 8 includes a joint 11 at the front and a motor compartment 12 at the rear. The joint 11 is a rectangular prism fastened to the outer housing 9 with screws. The motor compartment 12 is a cylinder having a smaller diameter than the joint 11. The motor compartment 12 accommodates the motor 4.

The motor 4 includes a stator 13 and a rotor 14. The rotor 14 includes a commutator 15 and a rotational shaft 16. The motor 4 is accommodated in the motor compartment 12 with the rotational shaft 16 extending in the front-rear direction. The rotational shaft 16 extends through the joint 11 into the inner housing 10.

The outer housing 9 is formed from resin. The outer housing 9 includes a front cylindrical portion 17 and a rear cylindrical portion 18. The front cylindrical portion 17 is a cylinder extending frontward and having a circular cross section. The rear cylindrical portion 18 is a cylinder having a larger diameter than the front cylindrical portion 17. The joint 11 in the motor housing 8 is connected to the rear cylindrical portion 18. The front cylindrical portion 17 is, in an upper portion of the rear cylindrical portion 18, decentered from the rear cylindrical portion 18. A side handle 19 is attachable to the front cylindrical portion 17.

The output unit 5 includes a tool holder (final output shaft) 20, a piston cylinder 21, a striker 22, and an impact bolt 23.

The tool holder 20 is a cylinder accommodated in the front cylindrical portion 17 coaxially with the front cylindrical portion 17. The tool holder 20 is held by the front cylindrical portion 17 and the inner housing 10 in a rotatable manner. The tool holder 20 has its front end protruding frontward from the front cylindrical portion 17. An operation sleeve 24 is located at the front end of the tool holder 20. The operation sleeve 24 is operable to attach and detach a bit (tip tool) B to and from the front end of the tool holder 20. A gear 25 is externally mounted on the tool holder 20 in the rear cylindrical portion 18.

The piston cylinder 21 has an opening in its front end. The piston cylinder 21 is accommodated in a rear portion of the tool holder 20 to be movable back and forth. The striker 22 is accommodated in the piston cylinder 21 in a manner movable back and forth through an air chamber 26. The impact bolt 23 is accommodated in the tool holder 20 in front of the striker 22 to be movable back and forth.

In the output unit 5, a countershaft 27 is located below the tool holder 20 in a rotatable manner. The countershaft 27 is parallel to the tool holder 20. The rotational shaft 16 of the motor 4 has a pinion 28 at its front end. The pinion 28 protrudes above the countershaft 27.

The countershaft 27 includes a first gear 29 in its rear portion in a manner integrally rotatable with the countershaft 27. The first gear 29 meshes with the pinion 28. The countershaft 27 includes a second gear 30 in its front portion in a manner rotatable separately from the countershaft 27. The second gear 30 meshes with the gear 25 on the tool holder 20. In front of the first gear 29, a boss sleeve 31 is externally attached to the countershaft 27 in a manner rotatable separately from the countershaft 27. The boss sleeve 31 holds an arm 33 upward with a swash bearing 32 having its axis tilted. The distal end of the arm 33 is connected to the rear end of the piston cylinder 21.

A first clutch 34 and a second clutch 35 are coupled with splines between the boss sleeve 31 and the second gear 30. The first clutch 34 engages with the boss sleeve 31 at a retracted position. Rotation of the countershaft 27 is thus transmitted to the boss sleeve 31 through the first clutch 34. When the first clutch 34 advances and separates from the boss sleeve 31, rotation of the countershaft 27 is not transmitted to the boss sleeve 31.

The second clutch 35 engages with the second gear 30 at an advanced position. Rotation of the countershaft 27 is thus transmitted through the second clutch 35 to the second gear 30, and further to the gear 25 and the tool holder 20. When the second clutch 35 retracts and separates from the second gear 30, rotation of the countershaft 27 is not transmitted to the second gear 30 and the tool holder 20.

Two plates 36 are located below the countershaft 27 to be movable back and forth. The two plates 36 engage with the first clutch 34 and the second clutch 35. The position of each plate 36 is changeable with a switching knob 37. The switching knob 37 is located on the lower surface of the rear cylindrical portion 18 to be operable by rotation. The switching knob 37 includes eccentric pins 38 protruding upward. Each eccentric pin 38 engages with the corresponding plate 36. The switching knob 37 engages with a lock plate 39 that is engageable with and disengageable from the second gear 30.

The switching knob 37 is rotated to switch each plate 36 between a front position and a rear position through the eccentric pin 38. In other words, the operator can select a drill mode, a hammer drill mode, a neutral mode, or a hammer mode by switching the positions of the first clutch 34 and the second clutch 35 between the front position and the rear position. Each operational mode will be described later.

The rear housing 3 is formed from resin and includes a pair of left and right half housings 3a and 3b. The half housings 3a and 3b are joined together with multiple screws placed from the right. The rear housing 3 includes an outer cylinder 40 at the front. The outer cylinder 40 covers the motor compartment 12 from the rear. The front end of the outer cylinder 40 has the same outer shape as the joint 11 in the motor housing 8. A handle 41 integral with the rear portion of the outer cylinder 40 extends downward. The handle 41 accommodates the switch 6 in its upper portion. The switch 6 causes a trigger 42 to protrude frontward.

The switch 6 is connected to a power cord 43. The power cord 43 extends from the lower end of the handle 41.

The outer cylinder 40 has multiple rear inlets (inlets) 44 in a right portion and a left portion of its rear surface. The outer cylinder 40 has multiple upper inlets (second inlets) 45 in a rear portion of its upper surface. The rotational shaft 16 receives a fan 46 as a centrifugal fan in the joint 11. The joint 11 has multiple outlets 47 on its lower surface and right side surface.

The vibration isolator 7 includes a rubber sleeve 50 and coil springs 51.

The rubber sleeve 50 is located between the joint 11 in the motor housing 8 and the outer cylinder 40 in the rear housing 3. The rubber sleeve 50 is a bellows-like rectangular prism. The rubber sleeve 50 has its front end engaged with the rear end face of the joint 11. The rubber sleeve 50 has its rear end engaged with the front end face of the outer cylinder 40.

The rubber sleeve 50 closes a portion between the front housing 2 and the rear housing 3 along the entire circumference. The rubber sleeve 50 expands and contracts in the axial direction as the front housing 2 and the rear housing 3 move relative to each other in the front-rear direction.

The coil springs 51 are located between the motor compartment 12 and the outer cylinder 40 in the rear housing 3. One of the coil springs 51 is located above the motor compartment 12. Two of the coil springs 51, which are right and left coil springs, are located below the motor compartment 12. The motor compartment 12 includes, on its upper surface, a front reception plate 52 extending in the lateral direction. The outer cylinder 40 includes, on its inner surface behind the front reception plate 52, a rear reception plate 53 extending in the lateral direction. The upper coil spring 51 is located between the front reception plate 52 and the rear reception plate 53 in the front-rear direction.

A pair of left and right front spring receivers 54 (FIG. 5) is located on the rear surface of the joint 11 below the motor compartment 12. A pair of left and right rear spring receivers 55 is located on the inner surface of the outer cylinder 40 behind the respective front spring receivers 54. The two lower coil springs 51 are each located between the corresponding front spring receiver 54 and the corresponding rear spring receiver 55 in the front-rear direction.

The front housing 2 and the rear housing 3 are urged in the front-rear direction to be apart from each other by the rubber sleeve 50 and the three coil springs 51. When the rear housing 3 is at a retracted position and apart from the front housing 2, an upper stopper 56 is in contact with a screw boss 57 as shown in FIG. 3. The upper stopper 56 protrudes frontward from the front reception plate 52. The screw boss 57 protrudes rightward from the left half housing 3a. A rear rib 58 extending in the lateral direction is in contact with a front rib 59 extending in the lateral direction below the motor compartment 12. The rear rib 58 protrudes downward from the motor compartment 12. The front rib 59 protrudes upward from the inner surface of the outer cylinder 40 in front of the rear rib 58. The rear housing 3 in a normal state is thus urged to the retracted position in FIG. 3 at which the upper stopper 56 is in contact with the screw boss 57 and the rear rib 58 is in contact with the front rib 59.

Figure 4:
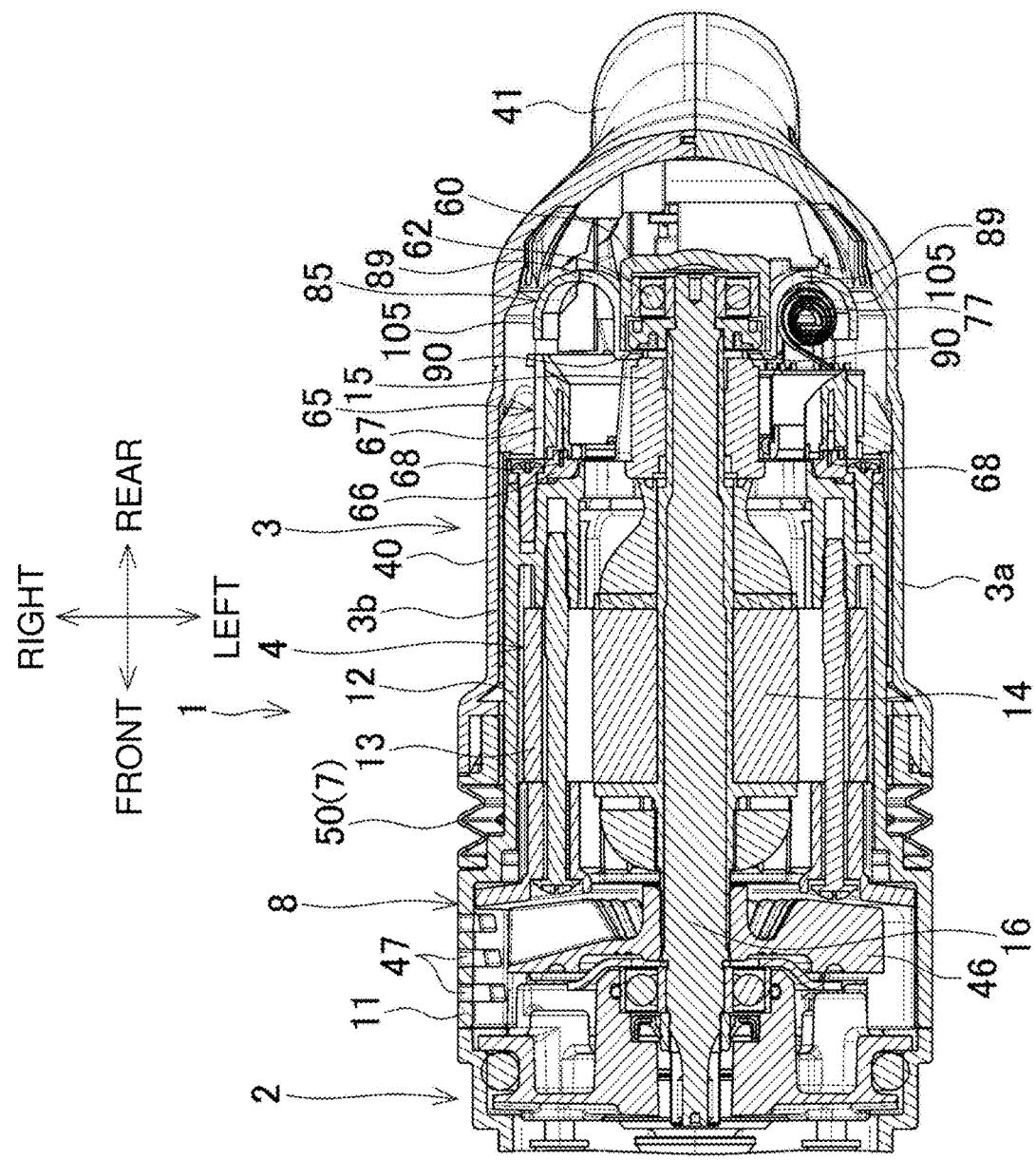
FIG. 4 is a partial sectional view taken along line B-B in FIG. 2.
Figure 7:
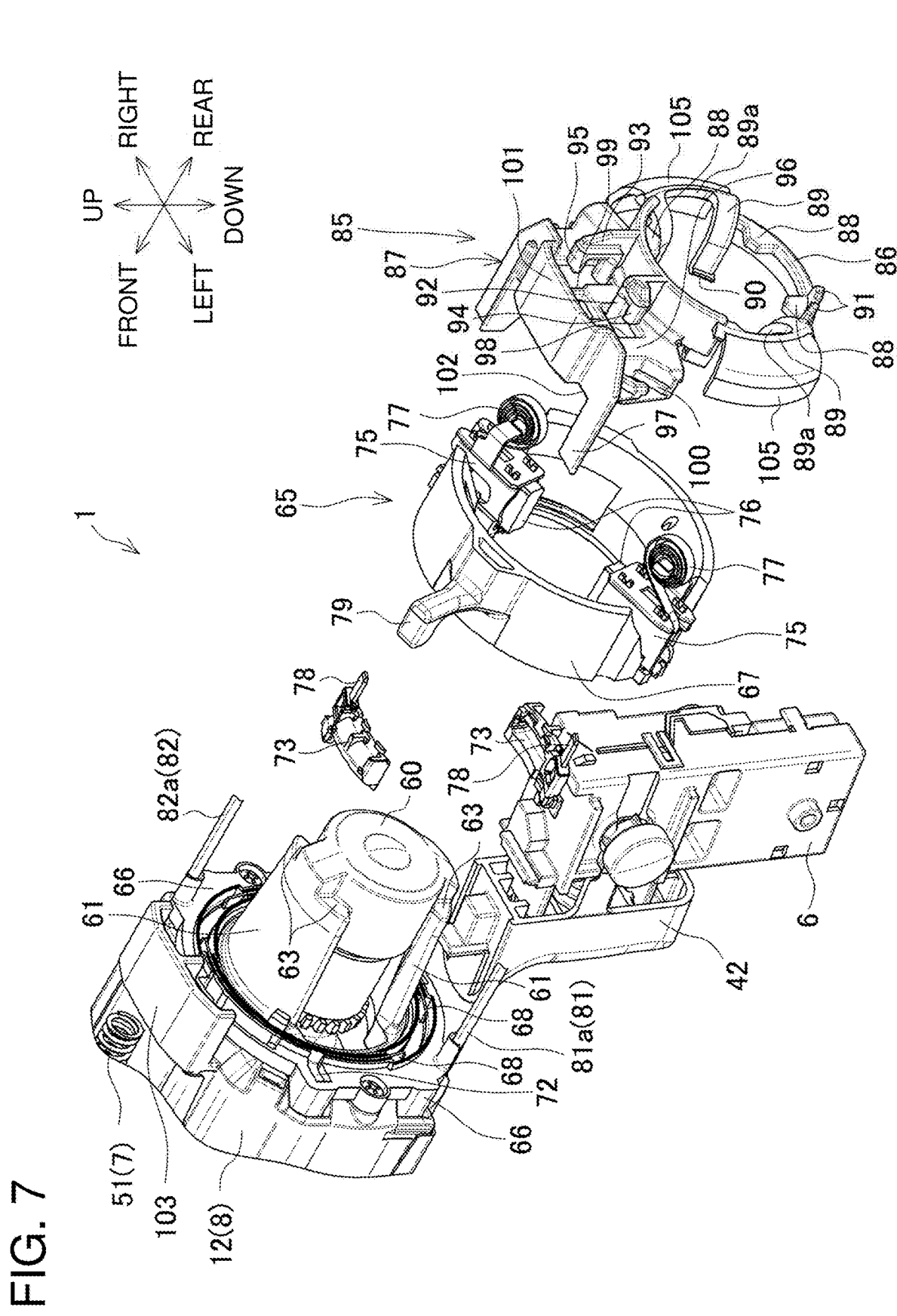
FIG. 7 is an exploded perspective view of a forward-reverse switch unit and a lead wire holder.

As also shown in FIGS. 4 and 7, a bearing retainer 60 is located at the rear of the motor compartment 12. The bearing retainer 60 has a smaller diameter than the motor compartment 12. The bearing retainer 60 is a cap having an opening in its front. The bearing retainer 60 is coaxially connected to the rear surface of the motor compartment 12 with upper and lower arm portions 61. The arm portions 61 extend in the front-rear direction. The bearing retainer 60 holds a bearing 62 on its rear inner surface to support the rear end of the rotational shaft 16. The arm portions 61 are concentric arcs about the axis of the rotational shaft 16. The commutator 15 in the rotor 14 has its left and right portions exposed between the arm portions 61. The rear end of each arm portion 61 has a pair of steps 63. Each step 63 is recessed frontward from the rear surface of the bearing retainer 60.

A forward-reverse switch unit 65 is joined to the rear surface of the motor compartment 12. The forward-reverse switch unit 65 includes a unit base 66 and a brush base 67.

Figure 8:
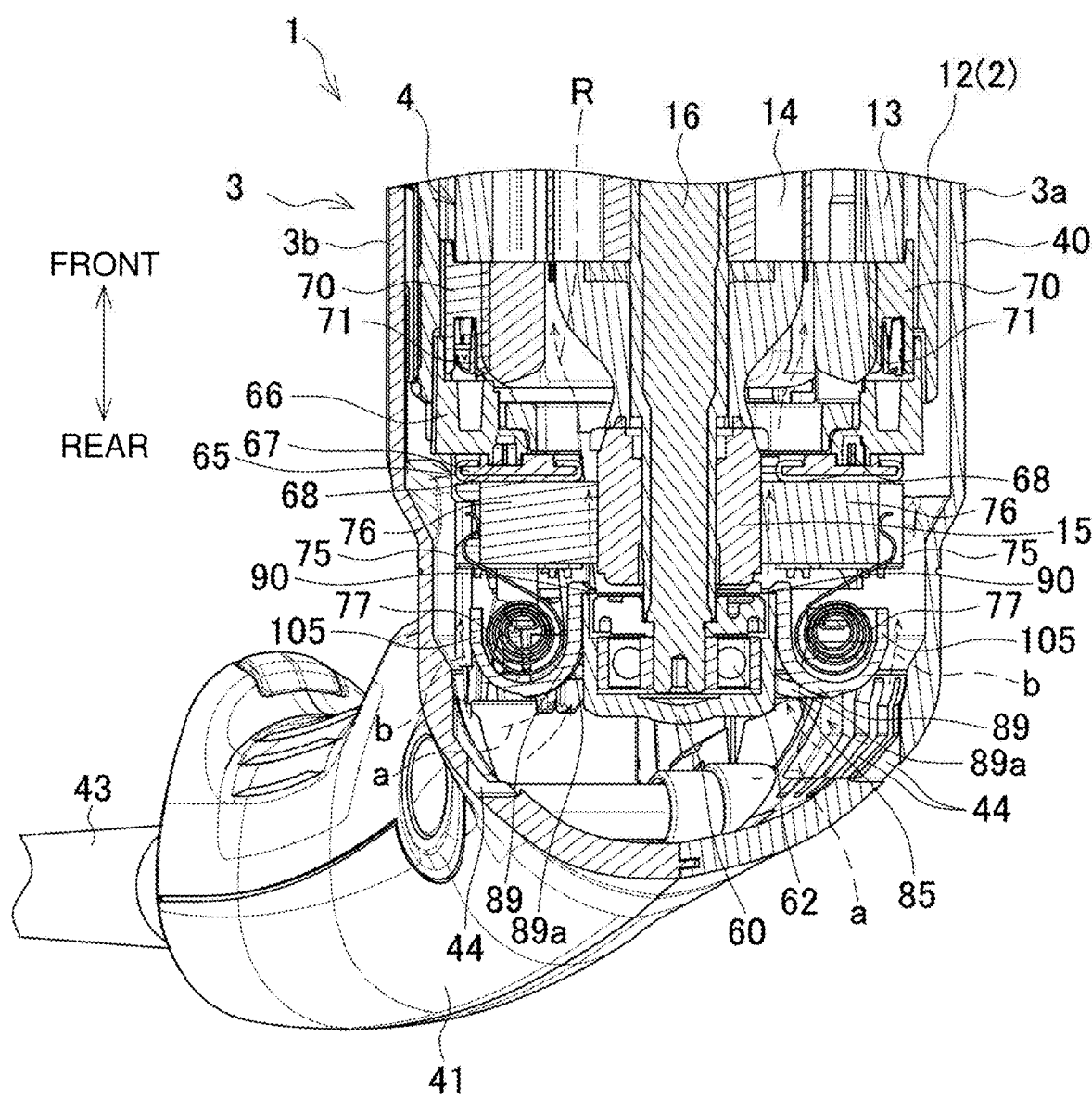
FIG. 8 is a partially enlarged sectional view taken along line C-C in FIG. 2.

The unit base 66 is a disk. The unit base 66 has two left and right portions fastened to the motor compartment 12 from the rear with screws to be coaxial with the motor compartment 12. The unit base 66 includes a pair of stationary contacts 68 as shown in FIGS. 7 and 8. The stationary contacts 68 are arc-shaped as viewed from the rear. The pair of the stationary contacts 68 are point-symmetric to each other with respect to the axis of the unit base 66.

An insulator in a rear portion of the stator 13 in the motor 4 includes four terminal retainers 70 (FIG. 8). The four terminal retainers 70 are at the apexes of a rectangle as viewed from the rear. Each terminal retainer 70 receives a terminal 71. The unit base 66 has four connection terminals 72 as shown in FIGS. 5 to 7 and 10. The four connection terminals 72 are electrically connected to the respective terminals 71. Of the four connection terminals 72, a first pair of upper left and lower right connection terminals 72 are located diagonally as viewed from the rear, and are integral with the pair of stationary contacts 68. A second pair of lower left and upper right connection terminals 72 located diagonally are connected to the respective lead wires 81 and 82 (described later).

The brush base (brush retainer) 67 is coaxially joined to the rear surface of the unit base 66 in a rotatable manner. The brush base 67 is a short cylinder. The brush base 67 includes a pair of brush holders 75 located point-symmetric to each other in the radial direction. Each brush holder 75 accommodates a carbon brush (brush) 76. The carbon brushes 76 are urged toward the axis of the brush base 67 by spiral springs (urging members) 77 in the brush holders 75. The carbon brushes 76 thus press the commutator 15 through a space between the two arm portions 61.

The brush base 67 has a pair of movable contacts 78. The movable contacts 78 are held integrally by the brush base 67 with a pair of holding blocks 73 attached to the brush base 67, as shown in FIG. 7. This allows the movable contacts 78 to be electrically connected to the carbon brushes 76. The movable contacts 78 are located on the same circle as the stationary contacts 68 in the unit base 66. The movable contacts 78 can be in and out of contact with the stationary contacts 68 as the brush base 67 rotates.

An operation projection 79 is located on the upper circumferential surface of the brush base 67. The operation projection 79 protrudes radially outward from the outer circumferential surface of the brush base 67. As shown in FIG. 1, the operation projection 79 extends through a window 80 in the upper surface of the rear housing 3 and is exposed upward from the upper surface.

The forward-reverse switch unit 65 is externally operable to rotate the brush base 67 with the operation projection 79. As the brush base 67 rotates, the movable contacts 78 come in contact or come out of contact with the stationary contacts 68 to switch the direction in which a current flows. This switches the rotation direction of the rotor 14. In other words, the brush base 67 is switchable between a forward rotational position, a reverse rotational position, and a neutral position. At the forward rotational position, the movable contacts 78 are in contact with the stationary contacts 68 in the forward rotational direction. At the reverse rotational position, the movable contacts 78 are in contact with the stationary contacts 68 in the reverse rotational direction. At the neutral position, the movable contacts 78 are between the forward rotational position and the reverse rotational position, and are thus out of contact with the stationary contacts 68. FIGS. 1 to 6 show the forward rotational position at which the operation projection 79 is at the left end of the window 80. When the operation projection 79 is pushed to the right end of the window 80, the brush base 67 is at the reverse rotational position. When the operation projection 79 is operated to be in the middle of the window 80 in the lateral direction, the brush base 67 is at the neutral position.

Figure 5:
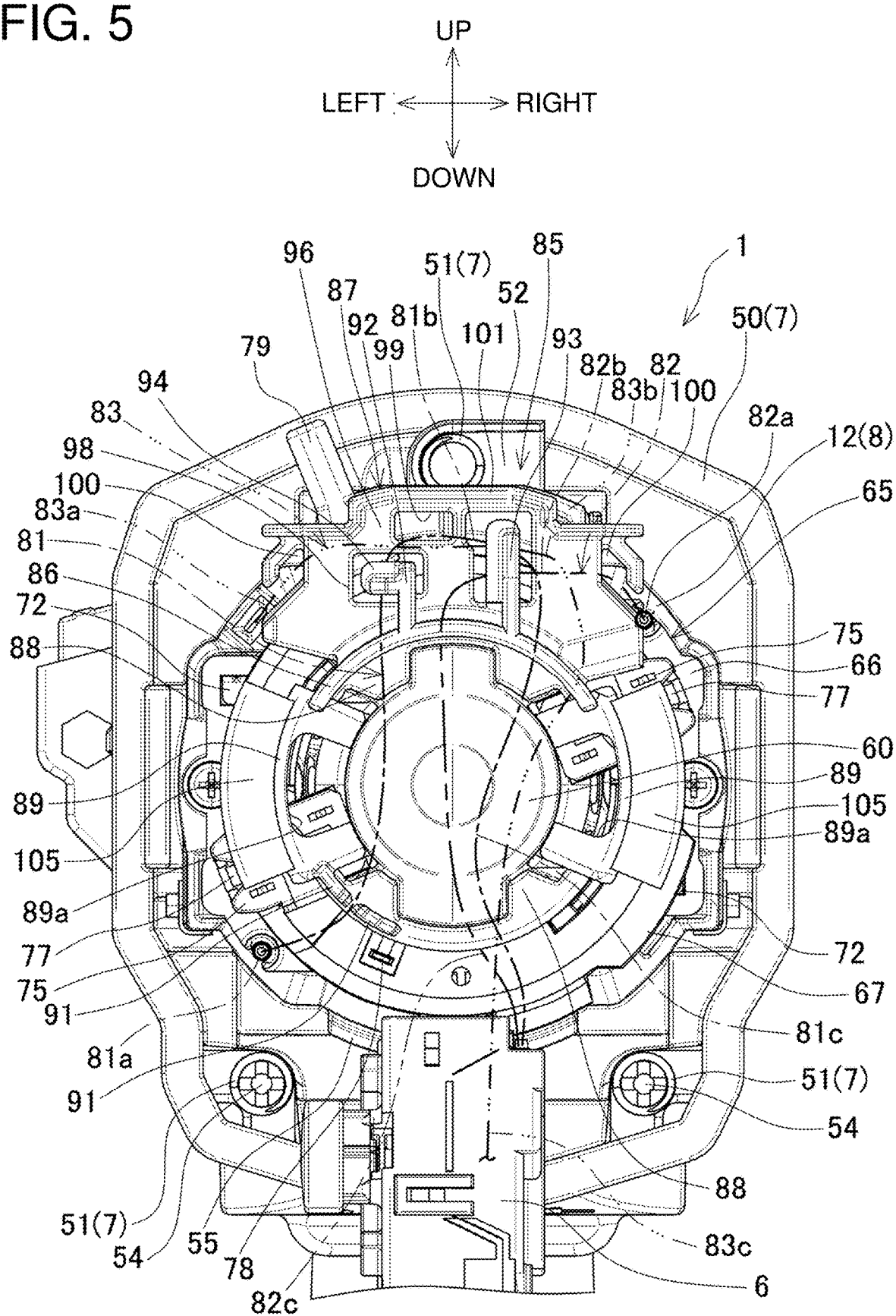
FIG. 5 is a partially enlarged rear view of the hammer drill at a forward rotational position without a rear housing.
Figure 6:
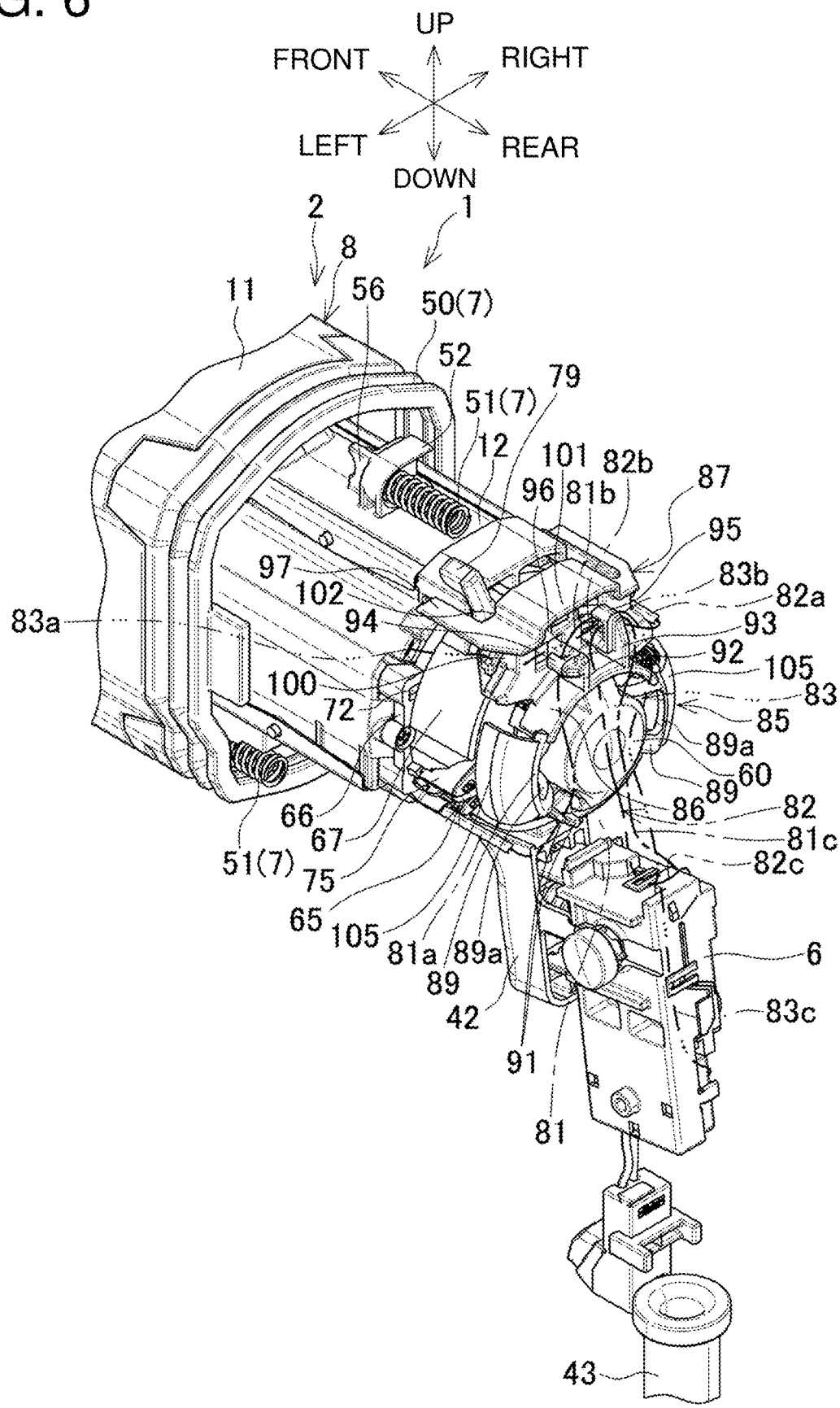
FIG. 6 is a perspective view of the hammer drill without the rear housing.

The stator 13 and the switch 6 are electrically connected by three lead wires (wires) 81, 82, and 83, as shown in FIGS. 5 and 6. The lead wires 81 and 82 are connected to the second pair of connection terminals 72 including no stationary contacts 68 and extend from the unit base 66. The lead wire 83 is connected to one (the upper left one in FIG. 5) of the connection terminals 72 that are integral with the stationary contacts 68, and extends from the motor compartment 12. Each of the lead wires 81 to 83 is held at the rear of the motor compartment 12 with a lead wire holder 85 joined to the bearing retainer 60.

The lead wire holder (wire holder) 85 is formed from resin. As shown in FIG. 7, the lead wire holder 85 includes a ring 86 and a support plate 87.

The ring 86 is annular and has an inner diameter larger than the diameter of the bearing retainer 60. The ring 86 includes upper and lower pairs of engaging tabs 88 on its inner circumferential surface. The pairs of engaging tabs 88 engage with the upper and lower steps 63 on the arm portions 61. The ring 86 has a pair of fitting tabs 89 on its left and right. The pair of fitting tabs 89 fit into the bearing retainer 60. The fitting tabs 89 are arc-shaped plates flaring radially outward toward the rear from the front end fitted into the bearing retainer 60. Each fitting tab 89 includes, along its circumferential front end, a hook 90 protruding inward. Each fitting tab 89 includes, in its middle portion in the circumferential direction, a vent 89a. Each vent 89a is a cutout extending from the front end to near the rear end of the corresponding fitting tab 89.

The hook 90 engages with the front end of the bearing retainer 60 from the front, as shown in FIGS. 4 and 8. This restricts rearward movement of the ring 86. The ring 86 has, on its front surface below the fitting tab 89, a pair of clamping tabs 91. Each clamping tab 91 protrudes rearward.

The ring 86 has, on its upper surface, a first retainer 92 and a second retainer 93 arranged laterally. The first retainer 92 is a plate extending in the front-rear direction and protruding upward. The first retainer 92 has a first engagement tab 94 integrally at its upper end. The first engagement tab 94 extends laterally. The first engagement tab 94 is L-shaped as viewed in plan and protrudes leftward.

The second retainer 93 is located right to the first retainer 92. The second retainer 93 is a plate extending in the front-rear direction and protruding upward. The second retainer 93 has a second engagement tab 95 integrally at its front end. The second engagement tab 95 extends frontward. The second engagement tab 95 is C-shaped as viewed laterally with the middle portion in the vertical direction being a cutout that is open frontward.

The support plate 87 includes a vertical plate 96 and a lateral plate 97. The vertical plate 96 extends upward from the upper rear end of the ring 86 in front of the first retainer 92 and the second retainer 93. The lateral plate 97 extends frontward from the upper end of the vertical plate 96. The vertical plate 96 has a first opening 98 in front of the first retainer 92. The first opening 98 is rectangular as viewed from the rear. The vertical plate 96 has a second opening 99 in front of the second retainer 93. The second opening 99 is inverted L-shaped as viewed from the rear.

The vertical plate 96 has a pair of right and left engagement grooves 100. The engagement grooves 100 are obliquely cut upward toward the middle in the lateral direction from the edges of the vertical plate 96, and then cut directly upward.

The lateral plate 97 has, in the middle in the lateral direction, an overhang 101. The overhang 101 protrudes rearward. The overhang 101 is located above the first retainer 92 and the second retainer 93 in a contactless manner. The lateral plate 97 has a cutout 102 in its front portion in the middle in the lateral direction. The cutout 102 is open frontward.

Joining of the lead wire holder 85 will now be described. The engaging tabs 88 are aligned with the steps 63 to fit the ring 86 to the bearing retainer 60 from the rear. The bearing retainer 60 then fits between the pair of the fitting tabs 89, and the hook 90 is engaged with the front end of the bearing retainer 60. This prevents the lead wire holder 85 from slipping off rearward.

In this state, the lateral plate 97 is located above the brush base 67. The motor compartment 12 includes, on its upper surface, a protrusion 103. The protrusion 103 protrudes rearward. With the lead wire holder 85 being joined, the protrusion 103 fits into a front portion of the cutout 102 in the lateral plate 97 to cover the front of the cutout 102. The operation projection 79 extends through the cutout 102 and protrudes upward behind the protrusion 103.

As shown in FIGS. 5 and 6, the lead wire 81 indicated by a dot-dash line has a starting end 81*a* extending rearward from the unit base 66 outside the brush base 67. The lead wire 81 is then held between the clamping tabs 91 on the lead wire holder 85. The lead wire 81 held between the clamping tabs 91 extends upward behind the bearing retainer 60 with slack, and has its middle portion 81*b* engaged with the first engagement tab 94 from below. The middle portion 81*b* engaged with the first engagement tab 94 extends rightward from the first retainer 92 and is engaged with the second engagement tab 95 from the left. The vertical plate 96 is located in front of the first and second engagement tabs 94 and 95. The first opening 98 and the second opening 99 allow smooth engagement of the lead wire 81. After the lead wire 81 is routed, the vertical plate 96 restricts frontward movement of the middle portion 81*b*.

The lead wire 81 extending rightward from the second engagement tab 95 is routed downward behind the bearing retainer 60 and has a terminal end 81*c* connected to the switch 6. In other words, the lead wire 81 extends from below the axis of the motor compartment 12, and the middle portion 81*b* is held above the axis by the lead wire holder 85 in the lateral direction. The lead wire 81 is then routed below the axis again and connected to the switch 6.

The lead wire 82 indicated by a two-dot-dash line has a starting end 82*a* extending rearward from the unit base 66 outside the brush base 67. The lead wire 82 is then engaged with the right engagement groove 100 on the vertical plate 96 from the front. The lead wire 82 engaged with the engagement groove 100 extends rearward and then is routed leftward with a middle portion 82*b* being slacked. The middle portion 82*b* is then engaged with the second engagement tab 95 from the right and extends to the left of the second engagement tab 95. The second opening 99 allows smooth engagement of the middle portion 82*b*. The vertical plate 96 thus restricts frontward movement of the middle portion 82*b*.

The lead wire 82 extending from the second engagement tab 95 is routed downward behind the bearing retainer 60 and has a terminal end 82*c* connected to the switch 6. In other words, the lead wire 82 has the middle portion 82*b* held by the lead wire holder 85 above the axis of the motor compartment 12 in the lateral direction. The lead wire 82 is then routed below the axis and connected to the switch 6.

The lead wire 83 indicated by a three-dot-dash line has a starting end 83*a* extending rearward from the motor compartment 12 outside the unit base 66. The lead wire 83 is then engaged with the left engagement groove 100 on the vertical plate 96 from the front. The lead wire 83 engaged with the engagement groove 100 extends rearward and then is routed rightward with a middle portion 83*b* being slacked. The middle portion 83*b* is then engaged with the second engagement tab 95 from the left and extends to the right of the second engagement tab 95. The second opening 99 allows smooth engagement of the middle portion 83*b*. The vertical plate 96 thus restricts frontward movement of the middle portion 83*b*.

The lead wire 83 extending rightward from the second engagement tab 95 is routed downward behind the bearing retainer 60 and has a terminal end 83*c* connected to the switch 6. In other words, the lead wire 83 has the middle portion 83*b* held by the lead wire holder 85 above the axis of the motor compartment 12 in the lateral direction. The lead wire 83 is then routed below the axis and connected to the switch 6.

Each fitting tab 89 on the ring 86 has a cover 105. Each cover 105 has a plate having an arc-shaped cross section. Each cover 105 extends continuously from the rear end of the corresponding fitting tab 89 in the circumferential direction and has a relatively small width. Each cover 105 extends more frontward at more radially outward positions.

Thus, each cover 105 covers the corresponding spiral spring 77 from the rear and radially outside, as shown in FIGS. 5, 6, and 8.

Figure 9:
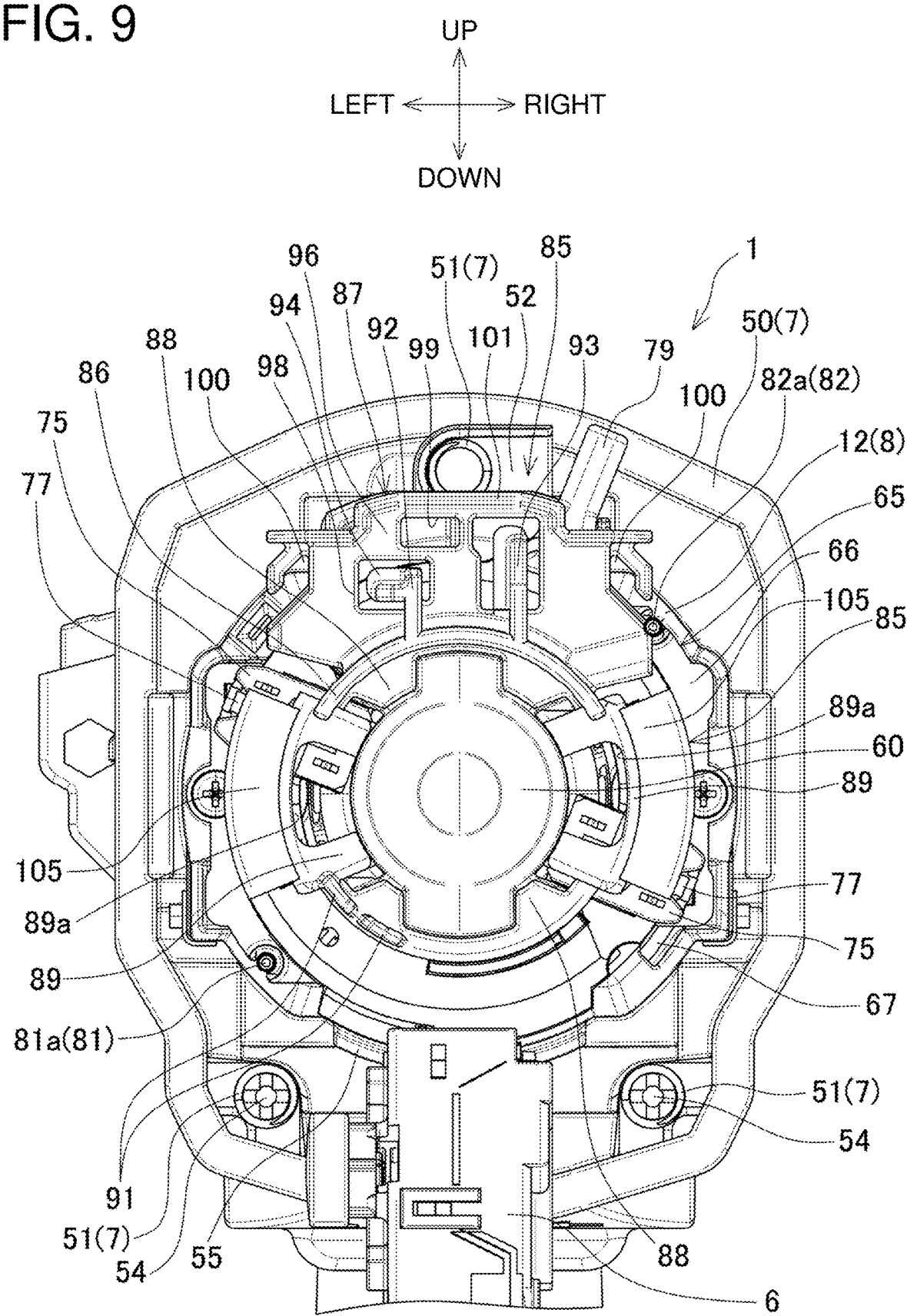
FIG. 9 is a partially enlarged rear view of the hammer drill at a reverse rotational position without the rear housing.
Figure 10:
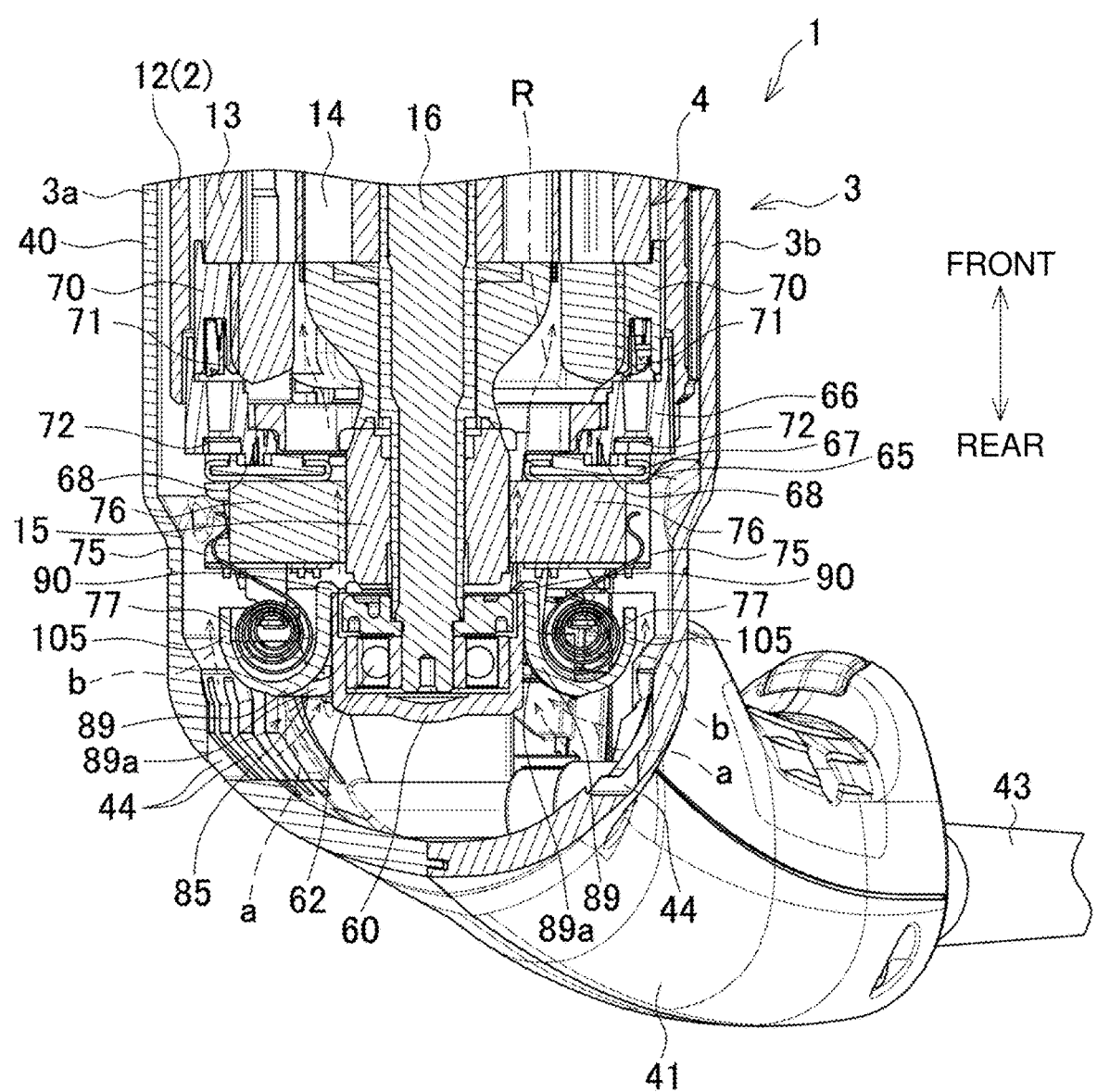
FIG. 10 is a partially enlarged sectional view taken along line C-C in FIG. 2 at the reverse rotational position.

In this state, each cover 105 is located between the corresponding spiral spring 77 and the left or right rear inlets 44. This blocks viewing of the spiral springs 77 from the rear inlets 44. The same applies when the brush base 67 is switched to the reverse rotational position in the forward-reverse switch unit 65, as shown in FIGS. 9 and 10. In other words, each cover 105 entirely covers, from the rear and radially outside, the area between the forward rotational position and the reverse rotational position (about 45 degrees) in which the corresponding spiral spring 77 is movable.

The operation of the hammer drill 1 with the above structure will now be described.

The switching knob 37 is switched to the drill mode. This causes the first clutch 34 to move to the advanced position and separate from the boss sleeve 31 and the second clutch 35 to move to the advanced position and engage with the second gear 30. Rotation of the countershaft 27 is thus not transmitted to the boss sleeve 31 but to the second gear 30.

In response to the trigger 42 being pressed to turn on the switch 6, the motor 4 is driven to rotate the rotational shaft 16. The tool holder 20 is then rotated with the first gear 29 to rotate the bit B on the tip. The boss sleeve 31 does not rotate, and thus no striking operation is performed.

The countershaft 27, the second clutch 35, the second gear 30, the gear 25, and the tool holder 20 are collectively an example of a rotator in an aspect of the disclosure.

The switching knob 37 is then switched to the hammer drill mode. This causes the first clutch 34 to move to the retracted position and engage with the boss sleeve 31, with the second clutch 35 remaining at the advanced position. Rotation of the countershaft 27 is thus transmitted to the boss sleeve 31 through the first clutch 34.

Thus, in response to the trigger 42 being pressed to drive the motor 4, the tool holder 20 is rotated with the countershaft 27 to rotate the bit B on the tip. The boss sleeve 31 is also rotated to swing the arm 33 back and forth, causing the piston cylinder 21 to reciprocate. The striker 22 then reciprocates and strikes the bit B with the impact bolt 23.

The countershaft 27, the first clutch 34, the boss sleeve 31, the swash bearing 32, the arm 33, the piston cylinder 21, the striker 22, and the impact bolt 23 are collectively an example of a striker in an aspect of the disclosure.

The switching knob 37 is switched to the hammer mode. This allows the first clutch 34 to remain at the retracted position and causes the second clutch 35 to move to the retracted position and separate from the second gear 30. Rotation of the countershaft 27 is thus transmitted to the boss sleeve 31 alone.

Thus, in response to the trigger 42 being pressed to drive the motor 4, the piston cylinder 21 reciprocates, and the striker 22 strikes the bit B with the impact bolt 23. The tool holder 20 does not rotate.

When the switching knob 37 is switched to the neutral mode, the lock plate 39, which is engaged with the second gear 30 in the hammer mode, separates from the second gear 30. The tool holder 20 is thus free to rotate together with the second gear 30, with the bit B being adjustable to any angle about the axis.

When using the hammer drill 1 as described above, the operator gripping the handle 41 manually presses the rear housing 3 frontward. The rear housing 3 then moves forward against an urging force from the coil springs 51 in the vibration isolator 7. This separates the screw boss 57 from the upper stopper 56 and the front rib 59 from the rear rib 58. Any vibration generated in the output unit 5 or the motor compartment 12 in the front housing 2 is thus reduced by the coil springs 51 and is less likely to be transmitted to the rear housing 3. This reduces vibration transmitted to the hand of the operator gripping the handle 41 and reduces discomfort felt by the operator.

In this state, the bearing retainer 60 in the front housing 2 is relatively close to the handle 41 in the rear housing 3. However, the lead wires 81 to 83 are held in the lateral and vertical directions by the lead wire holder 85 behind the bearing retainer 60. The lead wires 81 to 83 are thus not to have contact with the handle 41.

The lead wires 81 to 83 are connected between the motor compartment 12 generating vibration and the switch 6 in the rear housing 3. The lead wires 81 to 83 may thus receive vibration from the motor compartment 12. However, the lead wires 81 to 83 are held by the lead wire holder 85 with the middle portions 81$b$, 82$b$, and 83$b$ routed in the lateral direction with slack. The lead wires 81 to 83 are thus less likely to bent by vibration. This effectively reduces damage to or degradation of the lead wires 81 to 83.

The lead wires 81 to 83 are held on the rear surface of the bearing retainer 60 apart from the left and right inner surfaces of the handle 41. This also prevents the lead wires 81 to 83 from being pinched between the lead wire holder 85 and the handle 41. In particular, the fitting tabs (protectors) 89 are located on the right and left of each of the lead wires 81 to 83 extending on the rear surface of the bearing retainer 60. The lead wires 81 to 83 are thus less likely to spread laterally, having less contact with, for example, the brush holders 75 or the spiral springs 77. Thus, the lead wires 81 to 83 are protected.

In response to the fan 46 rotating with the rotational shaft 16, as indicated by the dotted lines in FIG. 8, external air sucked through the rear inlets 44 and the upper inlets 45 passes through the outer cylinder 40 and the motor compartment 12 and is discharged through the outlets 47, thus generating an airflow R. This cools the forward-reverse switch unit 65 and the motor 4 located along the airflow R.

In this example, the spiral springs 77 that are conductive are located in front of the left and right rear inlets 44. However, the covers 105 on the lead wire holder 85 are located between the spiral springs 77 and the rear inlets 44. This leaves the distance for insulation between the rear inlets 44 and the spiral springs 77, and reduces the likelihood of short-circuiting caused by foreign objects entering through the rear inlets 44.

Each fitting tab 89 has the corresponding vent 89$a$ although the cover 105 is located. This allows most of the air sucked through the rear inlets 44 to flow through the vents 89$a$ toward the motor 4, as indicated by the dotted arrows a. A part of the air flows around the outside of the covers 105 toward the motor 4, as indicated by the dotted arrows b. This reliably allows the commutator 15 and the carbon brushes 76 to come in contact with the airflow R. The same applies when the brush base 67 is switched to the reverse rotational position in the forward-reverse switch unit 65, as shown in FIG. 10.

As described above, the front housing 2 in the hammer drill 1 according to the embodiment accommodates the motor 4 and the output unit 5. The motor 4 includes the stator 13 and the rotor 14. The rotor 14 includes the commutator 15 and the rotational shaft 16. The output unit 5 is driven by the motor 4. The hammer drill 1 includes the carbon brushes 76 in contact with the commutator 15, and the brush base 67 including the conductive spiral springs 77 urging the carbon brushes 76 against the commutator 15.

The fan 46 is located on the rotational shaft 16. The rear housing 3 has the rear inlets 44 that suck in air from outside in response to rotation of the fan 46, and the outlets 47 that discharge the sucked air. The motor 4 is located along the airflow R that flows between the rear inlets 44 and the outlets 47. The brush base 67 is located downstream from the rear inlets 44 in the airflow R.

The nonconductive covers 105 (formed from resin) located between the spiral springs 77 and the rear inlets 44 cover the spiral springs 77. The covers 105, together with the lead wire holder 85, are detachably attached to the front housing 2.

This structure has the rear inlets 44 not to be relocated to leave the distance for insulation between the rear inlets 44 and the spiral springs 77, although the spiral springs 77 urging the carbon brushes 76 are conductive. In other words, the motor 4 and the carbon brushes 76 can be cooled sufficiently, with the distance for insulation left between the rear inlets 44 and the spiral springs 77.

The housing includes the front housing 2 and the rear housing 3 joined to the front housing 2. The covers 105 are located in the motor compartment 12 in the front housing 2. The rear inlets 44 are located on the rear housing 3.

The covers 105 are thus easily joined to the motor compartment 12 before the rear housing 3 is joined.

The front housing 2 accommodates the motor 4 and the output unit 5. The rear housing 3 includes the handle 41.

This reduces the likelihood that dust and other objects generated by the operation of the output unit 5 is sucked through the rear inlets 44 near the handle 41.

The brush base 67 is rotated about the commutator 15 to switch the position of each carbon brush 76 relative to the commutator 15 between the forward rotational position to rotate the rotor 14 forward and the reverse rotational position to rotate the rotor 14 backward. Each cover 105 covers the area in which the corresponding spiral spring 77 is movable in response to rotation of the brush base 67.

This allows the distance for insulation left constantly between the rear inlets 44 and the spiral springs 77, with the brush base 67 being operable to switch between the forward rotational position and the reverse rotational position.

The output unit 5 is located in the front housing 2. The motor 4 is accommodated behind the output unit 5 with the rotational shaft 16 extending in the front-rear direction. The carbon brushes 76 as a pair are located on the left portion and the right portion of the brush base 67. The rear inlets 44 are located on the left portion and the right portion of the rear housing 3. Thus, the left and right carbon brushes 76 can be efficiently cooled by the air sucked through the left and right rear inlets 44.

The hammer drill 1 includes the lead wire holder 85 detachably attached to the front housing 2. The lead wire holder 85 holds the lead wires 81 to 83 extending from the motor 4. The covers 105 are located in the lead wire holder 85.

The lead wire holder 85 is thus used to easily attach and detach the covers 105 to and from the front housing 2.

The hammer drill 1 includes the fitting tabs 89 located in the lead wire holder 85. The fitting tabs 89 protect the held lead wires 81 to 83 from contact with the carbon brushes 76 and the spiral springs 77. The covers 105 are thus easily located in the fitting tabs 89.

The covers 105 are thus easily attachable together with the fitting tabs 89.

The urging members are the spiral springs 77.

Each carbon brush 76 is thus urged by a constant tensile force against the commutator 15.

The rear housing 3 has upper inlets 45 on its upper surface.

This can increase the volume of the airflow R.

The output unit 5 includes a rotator that rotates the tool holder 20 holding the bit B in response to rotation of the rotational shaft 16 and the striker that strikes the bit B in response to rotation of the rotational shaft 16.

Thus, the hammer drill 1 with the rotator and the striker efficiently cools the motor 4 and the carbon brushes 76, with the distance for insulation left between the rear inlets 44 and the spiral springs 77.

Modifications of the disclosure will now be described.

Each cover may have any shape other than in the embodiment. Each cover may have, for example, an L-shaped cross section, rather than the arch-shaped cross section. Each cover may be attached to the corresponding fitting tab as a separate component.

Each cover may not be large enough to entirely cover the area between the forward rotational position and the reverse rotational position in which the corresponding spiral spring is movable. Instead, multiple covers may be located to cover each spiral spring at the forward rotational position and at the reverse rotational position.

Each cover may not continuously extend on the corresponding fitting tab on the lead wire holder. Each cover may continuously extend on the ring in the lead wire holder.

The lead wire holder may have another shape as appropriate. For example, the fitting tabs may have vents of another shape or size. The vents may be eliminated. The ring may be attached to and detached from the bearing retainer in another manner. The lead wire retainer or the engagement tabs may have another shape. The two electric components connected with the lead wires are not limited to the motor and the switch. The two electric components may be, for example, a motor and a controller.

The covers may not be located on the lead wire holder. Covers as separate members may be detachably attached to the bearing retainer or the motor compartment.

The brush base may have another shape as appropriate. For example, the operation projection may be located, instead of on the upper part, on the left or right side to protrude from a window on a side surface of the housing.

The urging members are not limited to spiral springs, but may be leaf springs or coil springs.

The structure of the hammer drill is not limited to the structure in the embodiment.

For example, the vibration isolator may include fewer or more coil springs or may have the coil springs at different positions. Elastic members other than coil springs may be used. The vibration isolator may be eliminated. The housing may thus not be divided into front and rear parts.

The number of selectable operation modes is not limited to three. The switching knob may be at different positions as appropriate.

In the striking operation, the piston may reciprocate in the fixed cylinder rather than in the piston cylinder. The striker may directly strike the bit without the impact bolt. The striking operation may be performed using a crank assembly in place of the boss sleeve. The hammer drill may include a single clutch alone.

The power tool is not limited to the hammer drill in the embodiment. The structure according to one or more embodiments of the disclosure is applicable to any other power tools such as an electric hammer or an electric drill.

REFERENCE SIGNS LIST 1 hammer drill
2 front housing
3 rear housing
4 motor
5 output unit
6 switch
7 vibration isolator
8 motor housing
9 outer housing
10 inner housing
11 joint
12 motor compartment 13 stator
14 rotor
16 rotational shaft
17 front cylindrical portion
18 rear cylindrical portion
20 tool holder
40 outer cylinder
41 handle
44 rear inlet
45 upper inlet
46 fan
47 outlet
50 rubber sleeve
51 coil spring
60 bearing retainer
61 arm portion
65 forward-reverse switch unit
66 unit base
67 brush base
75 brush holder
76 carbon brush
77 spiral spring
81 to 83 lead wire
85 lead wire holder
86 ring
87 support plate
89 fitting tab
89a vent
105 cover
B bit
R airflow

What is claimed is:

1. A power tool, comprising:
a motor including
   a stator, and
   a rotor including a commutator and a rotational shaft;
an output unit drivable by the motor;
a fan located on the rotational shaft;
a housing accommodating the motor and the output unit, the housing having an inlet to suck in air from outside in response to rotation of the fan and an outlet to discharge the air sucked in, the housing accommodating the motor along a flow of the air between the inlet and the outlet;
a brush retainer downstream from the inlet, the brush retainer including
   a brush in contact with the commutator, and
   an urging member being conductive and urging the brush against the commutator; and
a cover being nonconductive and detachably attached to the housing, the cover being located between the urging member and the inlet and covering the urging member
wherein the housing includes
   a first housing, and
   a second housing joined to the first housing,
the cover is located in the first housing, and
the inlet is located on the second housing.

2. The power tool according to claim 1, wherein the first housing accommodates the motor and the output unit, and
the second housing includes a handle.

3. The power tool according to claim 2, wherein the brush retainer is rotatable about the commutator to switch a position of the brush relative to the commutator between a forward rotational position to rotate the rotor forward and a reverse rotational position to rotate the rotor backward, and
the cover covers an area in which the urging member is movable in response to rotation of the brush retainer.

4. The power tool according to claim 2, wherein
the output unit is located in a front portion of the housing,
the motor is accommodated behind the output unit with the rotational shaft extending in a front-rear direction,
a pair of the brushes are located on a left portion and a right portion of the brush retainer, and
a plurality of the inlets are located on a left portion and a right portion of the housing.

5. The power tool according to claim 2, further comprising:
a wire holder detachably attached to the housing, the wire holder holding a wire extending from the motor,
wherein the cover is located in the wire holder.

6. The power tool according to claim 1, wherein
the output unit is located in a front portion of the housing,
the motor is accommodated behind the output unit with the rotational shaft extending in a front-rear direction,
a pair of the brushes are located on a left portion and a right portion of the brush retainer, and
a plurality of the inlets are located on a left portion and a right portion of the housing.

7. The power tool according to claim 6, wherein
the housing has a second inlet on an upper surface.

8. The power tool according to claim 6, further comprising:
a wire holder detachably attached to the housing, the wire holder holding a wire extending from the motor,
wherein the cover is located in the wire holder.

9. The power tool according to claim 1, wherein
the urging member is a spiral spring.

10. The power tool according to claim 1, wherein
the output unit includes
   a rotator configured to rotate a final output shaft holding a tip tool in response to rotation of the rotational shaft, and
   a striker configured to strike the tip tool in response to rotation of the rotational shaft.

11. A power tool, comprising:
a motor including
   a stator, and
   a rotor including a commutator and a rotational shaft;
an output unit drivable by the motor;
a fan located on the rotational shaft;
a housing accommodating the motor and the output unit, the housing having an inlet to suck in air from outside in response to rotation of the fan and an outlet to discharge the air sucked in, the housing accommodating the motor along a flow of the air between the inlet and the outlet;
a brush retainer downstream from the inlet, the brush retainer including
   a brush in contact with the commutator, and
   an urging member being conductive and urging the brush against the commutator; and
a cover being nonconductive and detachably attached to the housing, the cover being located between the urging member and the inlet and covering the urging member,
wherein the brush retainer is rotatable about the commutator to switch a position of the brush relative to the commutator between a forward rotational position to rotate the rotor forward and a reverse rotational position to rotate the rotor backward, and
the cover covers an area in which the urging member is movable in response to rotation of the brush retainer.

12. The power tool according to claim 11, wherein
the output unit is located in a front portion of the housing,
the motor is accommodated behind the output unit with
  the rotational shaft extending in a front-rear direction,
a pair of the brushes are located on a left portion and a
  right portion of the brush retainer, and
a plurality of the inlets are located on a left portion and a
  right portion of the housing.

13. The power tool according to claim 11, further comprising:
a wire holder detachably attached to the housing, the wire
  holder holding a wire extending from the motor,
wherein the cover is located in the wire holder.

14. A power tool, comprising:
a motor including
  a stator, and
  a rotor including a commutator and a rotational shaft;
an output unit drivable by the motor;
a fan located on the rotational shaft;
a housing accommodating the motor and the output unit, the housing having an inlet to suck in air from outside in response to rotation of the fan and an outlet to discharge the air sucked in, the housing accommodating the motor along a flow of the air between the inlet and the outlet;
a brush retainer downstream from the inlet, the brush retainer including
  a brush in contact with the commutator, and
  an urging member being conductive and urging the brush against the commutator;
a cover being nonconductive and detachably attached to the housing, the cover being located between the urging member and the inlet and covering the urging member, and
a wire holder detachably attached to the housing, the wire holder holding a wire extending from the motor,
wherein the cover is located in the wire holder.

15. The power tool according to claim 14, further comprising:
a protector located in the wire holder to protect the wire held by the wire holder from contact with the brush and the urging member,
wherein the cover is located in the protector.

* * * * *